INVENTOR
DAN McLACHLAN, JR.,
EDMUND F. CHAMPAYGNE,
BY
ATTORNEY

Patented Nov. 11, 1952

2,617,942

UNITED STATES PATENT OFFICE 2,617,942

X-RAY MICROSCOPE

Dan McLachlan, Jr., Salt Lake City, Utah, and Edmund F. Champaygne, Stamford, Conn.; said Champaygne assignor, by mesne assignments, to said McLachlan, Jr.

Application March 20, 1951, Serial No. 216,572

3 Claims. (Cl. 250—53)

This invention relates to a method and device for producing enlarged images of materials by means of X-ray diffraction.

Various forms of radiation have been used in optical systems to produce enlarged images. Visible and ultraviolet light is employed in the well-known microscopes and other optical systems, and electron streams have been used in electron microscopes and similar devices.

In the visible, ultraviolet, and infrared range of radiation it is possible to use optical systems in which either refracting lenses or reflecting mirrors are used for image formation, because in this range of radiation there are available materials having widely different transmission rates for the energy in question and also materials which are so opaque to the radiation that satisfactory mirror surfaces can be prepared on which a large portion of the radiant energy can be reflected.

Streams of electrons can be converged and diverged by electrical means to produce effects similar to refractive lenses in the visible light range. However, X-rays have not been hitherto readily available for use as a radiation for enlarged image formation. The reason for this failure lies in the fact that there are no sufficiently great differences in speeds of propagation of X-rays in different substances so that refracting systems are not feasible. At the same time the penetration of X-rays is so great that the problem of an X-ray mirror has been insoluble except for a few special cases of substantially grazing incidence. X-rays being electromagnetic waves, of course, cannot readily be converged and diverged by magnetic or electrostatic lenses as can be streams of electrons.

This leaves only one property of materials which can be considered in the design of X-ray image formers, namely, their ability to diffract. However, the use of crystals as diffracting elements are subject to a serious limitation which has made their use for image formation impractical. Suitable diffracting crystals can be bent, but they can be bent only in one direction, compound curvature setting up stresses which break the crysals when they are bent in a different direction. When bent in one direction to form a cylindrical surface, it is possible to use large crystals to effect convergence and divergence of X-rays by diffraction, but only the rays are converged in only one dimension. In other words, the X-ray optical elements thus produced behave in a manner similar to cylindrical mirrors which permit forming enlarged images only of lines extending parallel to the axis of the cylinder and do not permit the formation of enlarged images of many different kinds with any satisfactory degree of definition.

The present invention utilizes the phenomenon of X-rays diffraction but overcomes the difficulties encountered with the cylindrical diffractors referred to above, permitting convergence in an additional dimension which, for the first time, makes practical the formation of enlarged images of useful definition by X-ray diffraction.

The problem of making a diffracting surface which will be capable of converging X-rays presents a serious but not insoluble problem. The fact that it is not possible to bend large crystals in two directions is overcome by using either a finely powdered material or materials which have a microcrystalline surface. The random orientation of the crystals in such surfaces results in their behavior, under suitable circumstances, as if they formed a diffraction mirror. In other words, convergence and divergence of X-rays can be effected by diffraction in a manner to give a result similar to that obtained by the reflection of a longer wave length radiation, such as light. For example, a condenser for X-ray beams can take the form of a solid having a frusto-conical aperture therethrough, the aperture having a surface either of powder or or microcrystalline materials such as brass, graphite, or lead. Such a solid is hereinafter termed a "cone." If the angle of the conical surface corresponds to a strong diffracting series of planes, the microcrystals will act as a condenser for parallel X-rays. When a suitable condenser cone is used with parallel X-radiation and a sample is placed in the truncated apex, the image of the sample can be enlarged by a second truncated cone which is inverted and aligned axially with the first cone. The enlargement will depend on the height of the cone resulting from the angle of its sides, as more fully hereinafter described. Much greater precision in design is necessary for a magnifying cone than for a cone acting as a condenser. First of all, the surface of the second or magnifying cone must be smooth having no unevenness as large, or larger, than the resolution desired. For example, for 500 diameter magnification the resolution needed is of the order of half a micron and the smoothness of the surface should be kept to a lower tolerance, preferably having no projections above about a quarter of a micron. Smaller degrees of magnification requiring less resolution do not impose quite so severe a condition of precision with respect to the surface.

The second factor depends on the nature of a diffracting suface. Since convergence results from a diffraction phenomenon and not from specular reflection, the X-rays penetrate through the surface of the cone and are diffracted at different levels in the surface of the cone to produce parallel beams. There will be a blurring or lack of definition due to the broadening effect of a series of parallel beams diffracted at different levels in the surface. This lack of definition may be visualized as a broadening of sharp lines or the formation of halos about points in the enlarged image. Here again the problem requires a compromise which is determined by the magnification to be used and hence by the resolution required. The thickness of the diffracting layer, therefore, should be of the same order of magnitude as the resolution. Again, a 500-diameter magnification would require a layer of the order of magnitude of half a micron.

Another way to approach the same result is to use a thick layer of microcrystalline metal of very high absorption, such as lead. Here, the beams diffracted from lower levels suffer so much energy absorption that the halos resulting are too dim to interfere seriously with the resolution of an image on a suitable film. Lead is not a convenient structural material because of its lack of rigidity but lead supported by more rigid materials, such as steel, glass and the like, may be used. Where a very fine powder is employed the same conditions of diffracting layer thickness hold true.

It is an interesting property of the method and device of the present invention that the enlarged image rays, on leaving the second or magnifying cone, leave as parallel rays of light and so a photographic plate may be separated somewhat from the second cone. There is no sharp image plane, all planes at all distances from the cone giving equally sharp images.

In the practice of the present invention, as indicated above, a complete or 360° condensing cone cooperating with a complete or 360° magnifying cone may be employed. However, this is not preferred as the use of complete cones causes formation of two superposed images on the photographic plate. To produce only one image on the photographic plate, it is preferred to mask 180° or one-half of the area of the condensing cone entirely. As a result, X-rays are diffracted only from one-half of the surface of the condensing cone and are magnified on only one-half of the opposite surface of the magnifying cone. The presence of the remaining halves of the two cones do no harm. This mask may be an X-ray opaque plate, such as a lead plate, fitted so as to cover one-half of the large end of the condensing cone. Alternatively, the non-operating halves of the two cones may be removed and this permits economy of material as the separated halves may be employed to form a new microscope. It will be noted that this is equivalent to using a beam of X-rays having a semicircular cross-section with complete or 180° cones.

The mechanism of image formation, which will be illustrated in more detail in the description of the operation of a typical device below, does not result in the type of focusing with which we are accustomed to deal in ordinary and electron optics because the beams of the enlarged image are parallel rays. If the analogy of the focusing of an image is to be used, the result approximates that which would be obtained in an optical focusing device where the element was set for infinity and therefore where the image distance became immaterial. For this reason the broader term of enlarged image formation is used in the present invention rather than the more precise concept of focusing.

The possibility of placing the image plane, for example, a photographic plate or film at any desired distance from the second cone makes possible a further refinement which avoids another type of interference in the X-ray optics of the present invention. Enlarged image formation, as described above, presupposes that the X-rays of the condensed beam pass through the object without deviation. With many materials which are suitable for X-ray optical investigation this ideal situation does not hold because these materials diffract a portion of the X-ray beam passing through them resulting in the generation of certain beams which, after diffraction from the surface of the magnifying cone, are not parallel to the image rays. This diffracted energy results in a blurring of the sharp edges of lines and points in the image. In some cases the diffracted energy may be too slight or the nature of the image sufficiently characteristic so that the blurring inherent in the phenomenon of diffraction from the object is not too serious. Moreover, some portions of the rays incident on the condensing and magnifying cones are diffracted at angles other than those desired. In some cases an image may be obtained without further equipment. However, in many cases the blurring resulting from the unwanted diffraction in the object or on the cones becomes too serious to be tolerated. In such cases it is possible to introduce a conventional collimator between the magnifying cone and the plane of the film or other image recorder. Such a system may be made from angular strip metal or may be a series of parallel tubes of very thin gauge metal giving an egg crate type of collimator. Where this is sufficiently long, and the parallel rays of the image emerging from the magnifying cone set no particular limit on its length, the scattered X-radiation due to the diffraction in the object can be completely absorbed. This type of collimator, of course, will produce its own sharp pattern on an image but in many cases the regular grid-shaped pattern is unobjectionable and may even be desirable where it is used as a reference grid for the image. In a few cases such a pattern may be objectionable and there it may be removed by moving the collimator back and forth. This results in spreading the lines of the collimator grid over the whole image uniformly, thus merely dimming the whole image to a slight extent. No great increase in exposure time becomes necessary because the open area of the collimator is so much greater than the area of the edge of the tubes that the percentage loss becomes very small. Particularly when the collimator is omitted, the sharpness of image can be much improved by filling the space which exists between the condensing and the magnifying cones with a circular lead disc having a central hole as large as the larger of the two cone apex orifices. This disc absorbs practically all of the irregularly diffracted rays from the condensing cone and some from the specimen. In addition it absorbs those very chance rays which pass straight through the condensing cone.

The question of duration of exposure referred to above requires consideration. While superficially the over-all output of the device and method of the present invention may look somewhat the same as that obtained with reflecting optics and ordinary light, the energy efficiency with X-rays is very much lower. X-ray diffraction is a relatively inefficient process and only a small portion of the cone of diffracted light from any point in the diffracting layer is utilized. As a result, the over-all energy level at the image is small requiring extremely long exposures. This, however, is the price that has to be paid in order to use X-ray image formation with resultant properties of imaging structure in samples which are opaque to visible light and to electron streams. Very intense sources of X-radiation are therefore necessary.

The loss in sharpness resulting from diffraction within a relatively thick diffracting layer on the cones, discussed above, would indicate the desirability of using very soft X-rays which penetrate poorly. However, when the radiation is too soft, other complications are encountered. For one thing, the thickness of sample which can be investigated is greatly decreased. Another and far more important factor lies in the difficulty of obtaining powerful diffraction in sharp lines. Thus, for example, X-radiation of a wave length of 10 Å would require diffracting substances having an interplanar spacing of 16 Å, which is found mainly in crystalline organic compounds. However, even where suitable diffracting material is used, the intensity and sharpness of diffracting lines at so high an interplanar spacing is very low and the available energy in the converged beam and energy forming rays is greatly reduced. 10 Å radiation represents the longer limit of desirable wave length, although the invention is still operative with even softer X-rays. As a result of the difficulties encountered when too soft or too hard X-radiation is used, the practical operating range is X-rays of 1 to 10 Å. Where the nature of the specimen permits, the best overall combination of resolution and intensity is a band with radiation of 3 to 5 Å.

It should be noted that the wave length of the X-radiation is not independent of the nature of the specimen to be examined, because certain materials have very high absorption characteristics for particular wave lengths due to resonance phenomena. For example, copper radiation ($K\alpha = 1.5418$ Å) is not suitable for the examination of thicker iron samples because of excessive absorption. It is therefore necessary that the X-ray source emit rays which have a suitable wave length for the material to be investigated, and this will also affect the cone angles and/or the diffracting layer. In order to obtain strong diffraction on the proper radiation, these three factors must be taken into consideration. It is of course possible to use a comparatively few cones to cover the most frequently used X-ray sources and these will permit examination of a wide variety of samples.

In a simple condenser cone some of the X-radiation will strike the sample directly. These rays would pass through the sample and as they are much more intense than the converged diffracted rays, they will produce an extremely dark spot on the center of the film. It is therefore desirable to provide the cones with a suitable small central trap and mask, for example a small brass rod or cylinder with a lead plug, in order to prevent this undiffracted radiation from striking the sample and so producing a glare spot on the enlarged image. This trap-mask combination also serves the important function of absorbing a portion of the irregularly diffracted rays which would be subsequently rediffracted in a plane parallel to the axis of the cone. A similar tube, or one made of lead, may be fitted into the magnifying cone to serve the same purpose there.

The range of X-ray wave lengths giving the best practical results is located at the borderline where serious scattering and absorption results when the beams pass through air or similar gases. In such cases the instrument may be operated under a moderate vacuum. Toward the extreme represented by long wave length radiation a vacuum is practically essential, whereas with the hardest radiation that gives useful results a vacuum may be dispensed with. In the middle of the band of X-radiation, the use of a vacuum is optional. In most cases the slight added complexity of equipment will be found well worth-while since extremely high vacua are not necessary to obtain a very great improvement in transmission.

The invention will be more particularly described in connection with the drawings in which the same parts are similarly designated, and in which.

Figure 1:
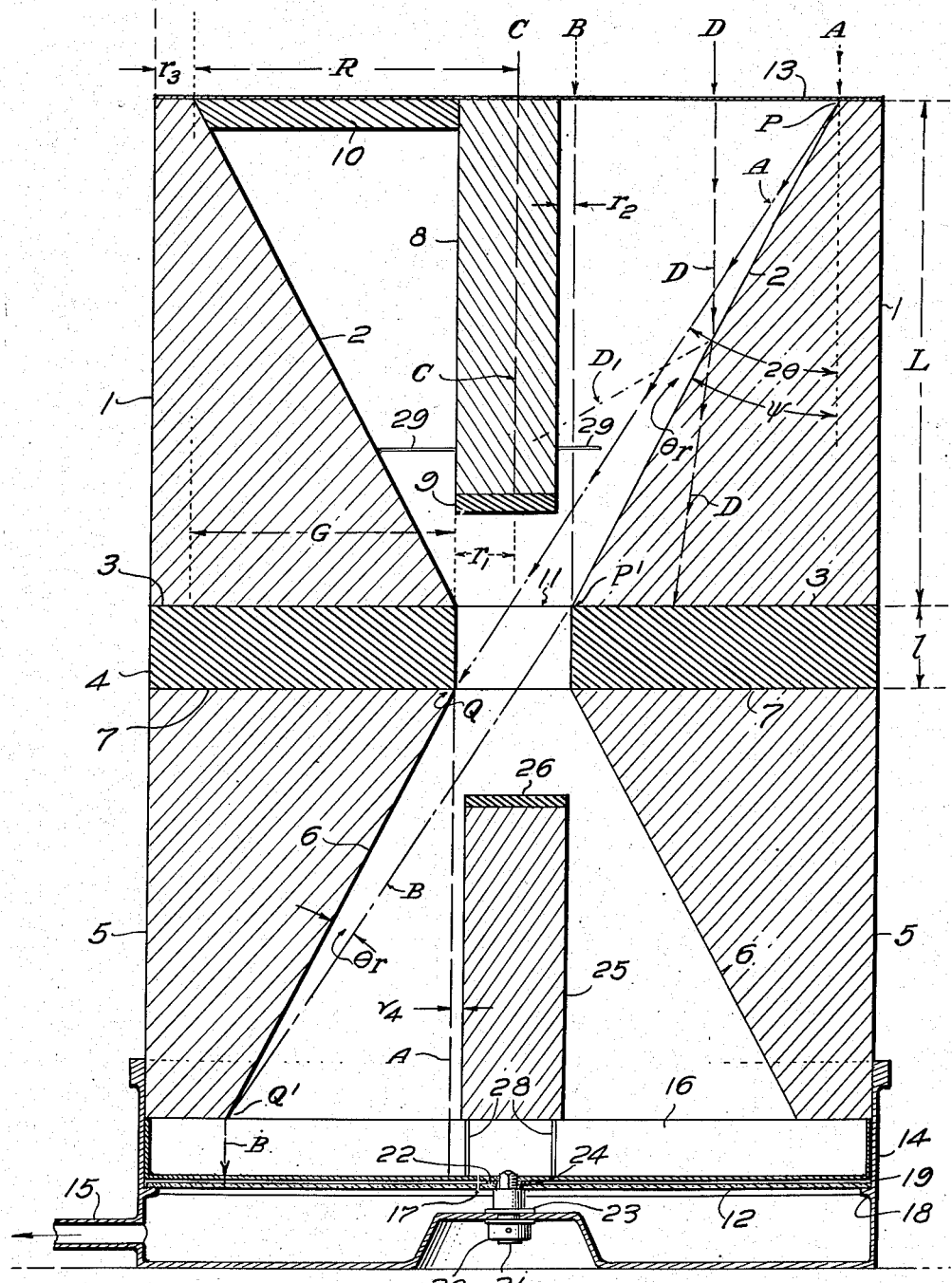
Fig. 1 is a vertical section line B—B' of Fig. 2 showing a device for producing enlarged images by X-ray diffraction according to the present invention, with an illustration of its mode of operation.

In Fig. 1, hollow truncated condensing cone 1 having diffracting inner surface 2 and base 3 is axially in series with hollow truncated magnifying cone 5 having inner diffracting surface 6 and base 7. Lead shield 4 of thickness 1, provided with central circular aperture of diameter $2r_1$, separates the cones. The cone angle of cone 1 is $\psi$, and since the magnifying cone 5 is shown as similar, the cone angle of the latter is equal to the former. The imaginary apex point of each of the cones 1 and 5 lies respectively at a point within the other cone. Surrounding the central axis of condensing cone 1 is brass rod 8 bearing lead plug 9 and spacing rods 29, the diameter of the rod and plug being slightly less than the diameter of the apex orifice of cone 1 and the axis of the rod being offset by distance $r_2$ from the axis of the cone towards lead shield 10. Magnifying cone 5 is provided with a similar rod 25 and plug 26 supported on axially spaced pins 28, the offset $r_4$ of rod 25 being equal to $r_2$ in amount but opposite in direction. One-half of the larger end of cone 1 is masked by X-ray opaque lead shield 10. Specimen 11 lies at a point approximately defined by the crossing point of rays which are diffracted from the inner surface of the condensing cone at the basal periphery thereof by angle $\theta_r$ and by angle $2\theta$ with respect to the axis of the cone. Circular, stationary photographic plate 12 supported at the wide end of magnifying cone 5 on flange 18 receives the resulting magnified image. Airtight chamber casing 14 provided with vacuum outlet 15 and containing collimator 16 therein permits air to be exhausted from the entire assembly through central pinhole 17 in photographic plate 12. The collimator mounted on flange 19 and washer 22 is made rotatable with respect to fixed photographic plate 12 and cone 5 by means of knob 20 on shaft 21 which engages the collimator through airtight gland 23 and aperture 24 in the photo plate. Beryllium window 13 supported on the shoulder of thickness $r_3$ acts as an air seal for cone 5 and as a means of support for rod 8.

In Fig. 1, the utilization of several of the incident parallel X-rays is shown. X-ray A is first diffracted on the inner surface 2 of cone 1 on the basal periphery P thereof, and a portion of said beam diverges from the inner edge of the cone by angle $\theta_r$, passes through a portion of specimen 11, is again diffracted on the inner surface 6 of cone 5 at its apex orifice periphery Q to form a ray parallel to the incident ray, which ray passes closely alongside rod 25 and plug 26 through collimator 16 to photographic plate 12 forming one portion of the image. X-ray B penetrates into cone 1 closely alongside rod 8 and plug 9, is diffracted on the inner surface 2 of the apex orifice $P^1$ of the cone, passes through a different portion of specimen 11, is diffracted at $Q^1$ in cone 5 to form a ray parallel to the incident ray, and contacts photographic plate 12 forming a different portion of the image. Ray C is a ray which passes into rod 8 along the main axis of the cone and is absorbed by lead plug 9. Ray D is a ray which falls on about the middle of the diffracting surface 2 of cone 1 and is in part undesirably diffracted by closely adjacent particles of polycrystalline randomly oriented material. One portion of the ray, $D_1$, diffracted at an angle greater than $\theta_r$, strikes brass tube 8 and is trapped therein. A second portion of this ray, $D_2$, proceeds through the body of condensing cone 1, and is trapped by lead shield 4.

Figure 2:
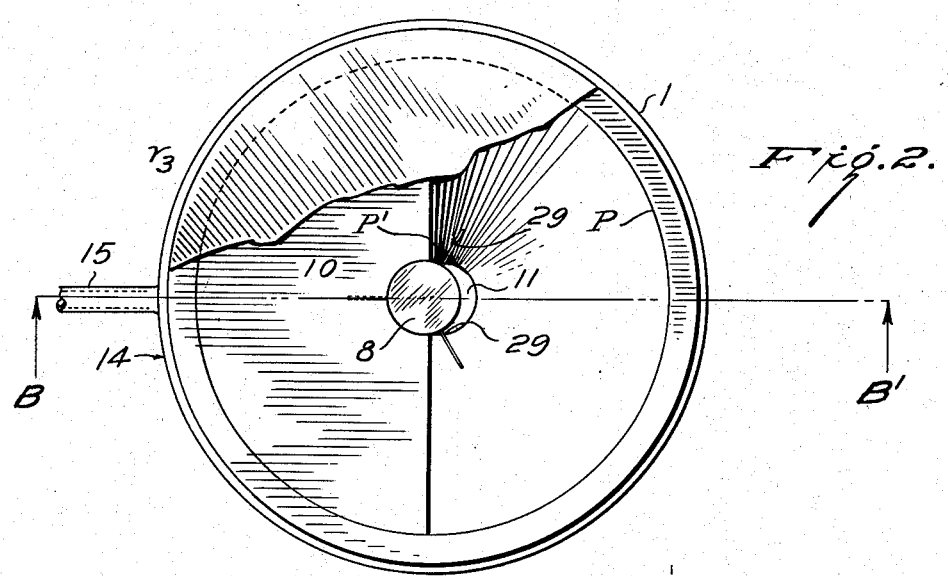
Fig. 2 is a horizontal plan, partly in section, of Fig. 1, showing a part of the interior thereof.

Fig. 2 shows the interior of a device similar to that of Fig. 1, beryllium plate 13 of Fig. 1 being partially removed. The top shoulder $r_3$ of condensing cone 1, half of the larger orifice of which is masked by lead plate 10, abuts upon one-half of offset brass rod 8, exposing half of the orifices P and $P^1$ of cone 1 and a portion of specimen 11. Vacuum exhaust 15 permits evacuation of vacuum chamber 14, if desired.

In Figs. 1 and 2, it will be noted that central brass tube 8 is slightly offset, its radius being sufficiently small and the amount of offset $r_2$ being sufficiently large so that only one-half of the periphery of cone 1 at its apex orifice is masked by the tube, the direction of the offset being in the direction of lead cover plate 10. This is merely one means for providing that one-half or 180° of the cone is completely exposed to the incoming beam of X-rays and that the other half is completely masked. In the drawing, it will be seen that distance R is equal to distance G plus distance $r_1$ and that distance $r_2$ is merely sufficient to allow ray A to fall upon point Q. The distance R is not critical and merely represents a convenient distance. It will be seen that no useful purpose would be achieved by increasing length L and thereby increasing distance R, as any ray which has a distance from ray C greater than that of ray A would not be diffracted anywhere on cone 5 but would be absorbed by lead plate 4 or by rod 8 and plug 9.

Figure 3:
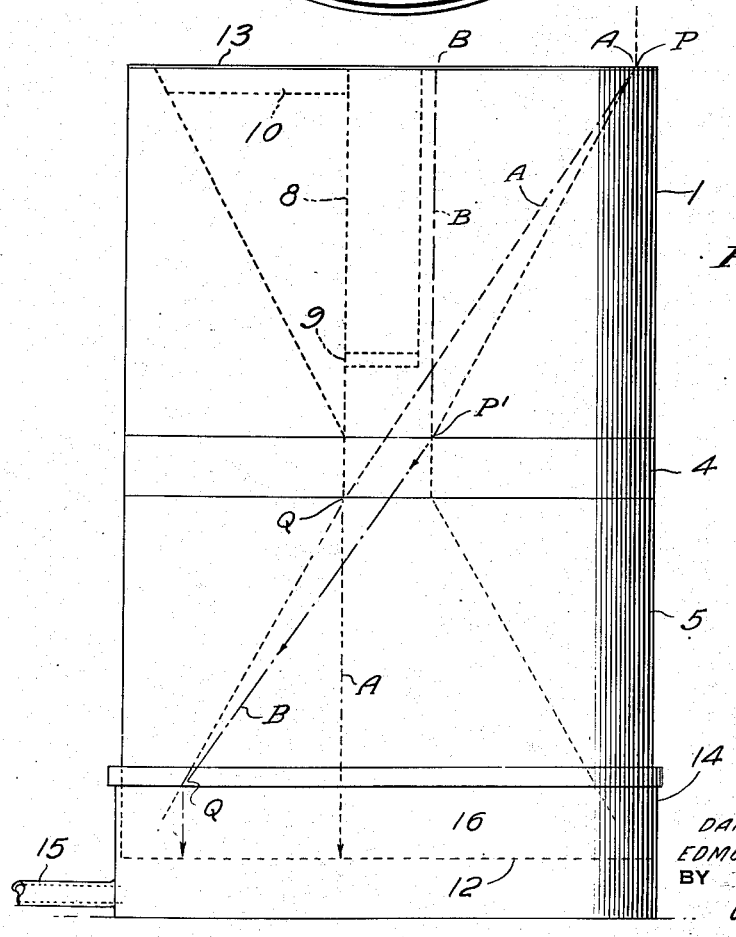
Fig. 3 is a vertical plan of the device of Fig. 1.

Fig. 3 is a vertical elevation partly in section of a device similar to that of Figs. 1 and 2. Condensing cone 1 having diffracting surface 2 supports window 13 and lead shield 10. Brass rod 8 and lead plug 9 depend from the window. Annular lead shield 4 separates cone 1 from cone 5 which rests on vacuum chamber 14 having exhaust 15 and containing rotatable collimator 16 and photographic plate 12. X-ray A is shown as being diffracted at point P, passing through sample 11, re-diffracted at point Q, passing through collimator 16 and contacting photo plate 12 forming one part of the image. Ray B is shown as entering the cone rather centrally, being diffracted at point P', being re-diffracted at point Q' and falling on photo plate 12 to form another portion of the image.

It is an advantage of the design of the above-mentioned apparatus that once the components have been accurately machined and fitted together, a light application of vacuum grease permits a sufficient degree of vacuum to be readily maintained with an ordinary laboratory vacuum pump.

In Fig. 1, which is only schematic, the cones are shown as having the same angle $\psi$. In practice, the angles of the two cones will frequently differ from each other. Each must, of course, closely approximate the correct angle for a strong diffraction beam and this angle will differ for the material of which the respective diffracting surfaces are composed. It is necessary that the angles be extremely exact as any considerable departure results at once in a serious loss in energy and a loss in definition. In general, the angles should be kept very close to the correct respective angles, departures of more than a tenth a degree resulting in marked loss in efficiency and sharpness of image. Where large magnification is desirable this can frequently be obtained by using a magnifying cone of flatter angle than the condensing cone, though the angle of the magnifying cone again must correspond to the correct angle for a strong diffraction ray.

The method and apparatus of the present invention should not be thought of as producing enormous magnifications. This is not the purpose of the invention and the precision of surface and thickness of diffracting layers set a limit as does the length of exposure. In general, the invention is much more useful for magnifications of about 50 diameters than it is for greater degrees of magnification.

The angle $\psi$ of the cones is chiefly dependent on three variables: the spacing of the diffracting crystal planes, the wavelength of the X-radiation used, and the desired angle of divergence of the diffracted X-rays from the surface of the cone. If copper $K\alpha$ radiation ($CuK\alpha=1.5418$ Å) is used and brass is the diffracting material with the 2.08 Å spaced planes being the diffracting planes, the Bragg angle $2\theta$ (as calculated from the equation: $n\lambda=2d \sin \theta$) will be about 43.5°. It can be shown that the angle will be equal to $4\theta-2\theta_r$ or $2\theta-\theta_r$ for its axial divergence, where $\theta_r$=the desired angular divergence of the diffracted ray from the cone surface. If we wish $\theta_r$ to be equal to 3° then the angle cone $\psi$ will be 40.5°.

The angle of divergence of the diffracted X-ray beam from the surface of the cone is of importance in designing both the condensing cone and the magnifying cone. In the case of the condensing cone this angle determines the degree to which the incident beam is condensed, e. g. as $\theta_r$ is decreased in size the diffracted rays come closer together until at $\theta_r=0$° the diffracted rays have the same path. Since the diffraction largely takes place within the diffracting material, the diffracted rays will not emerge from the surface of the cone unless $\theta_r$ has finite value. As $\theta_r$ is increased, the diffracted rays move farther apart until at $\theta_r=\theta$ they are the same distance apart as is the incident beam and no condensation occurs. This same process but in reverse, occurs with the magnifying cone. Here, however, it is of greater significance in that the degree of magnification obtainable depends on the expansion of the condensed beam into the rediffracted parallel beam. For this reason, in the magnifying cone, $\theta_r$ should be as small as feasible taking into account the increased accuracy of machinery the cone requires as $\theta_r$ is decreased. With the condensing cone the accuracy of the surface is not so critical but it may be advisable to use a 5° or greater $\theta_r$ with the condensing cone and a 2° or 3° $\theta_r$ with the enlarging cone.

The aperture of the apical orifice of the cones should be of such size as just to allow the diffracted ray from the outermost edge of the incident beam to pass through. Thus the size of the aperture will depend on the cone angle $\theta_r$, and the size of the incident beam. In the case described above, if the incident beam is cylindrical with a diameter of 1 cm., the aperture of the cone is about 0.57 mm.

No general mathematical formula has been devised for correlating the frequency of the incident X-rays with the respective cone angles with the cone orifice diameter and with the material of which the respecting diffracting surfaces are composed. However, the following formula may be employed for this purpose in the circumstances which follow:

$$\frac{1}{M} = 1 - \frac{\tan 4}{\tan\left(2 \text{ arc sin} \frac{\lambda}{2d}\right)}$$

where $M$=magnification as the ratio of the size of the object and image,
$\psi$=the cone angle
$\lambda$=the wave length of the X-ray beam This formula may be used to correlate $M$, $\psi$ and $\lambda$ where the cone has been constructed according to the disclosure of the present specification, the correct cone angle $\psi$ has been selected, and the interplanar spacing of the diffracting zone and the wavelength of the X-rays are known.

We claim:

1. As a new article of manufacture useful for the production of enlarged images by means of X-ray diffraction, in combination, a first solid having a frusto-conical perforation therethrough, a second solid having a frusto-conical perforation therethrough, and a sheet of a heavy metal, the axes of said perforations being in series, the apex orifices of each of said perforations abutting the apex orifice of the other, said sheet being at right angles to the main axes of said perforations, at least the inner surfaces of said perforations being composed of a polycrystalline randomly oriented X-ray diffracting material, the angles of the sides and the minimum diameters of the apical orifices thereof being characterized in that when a thin specimen of a heterogeneous material is placed at about the narrowest portion of the apex orifice of said first perforation transversely to the main axis thereof, and when the inner surface of said perforation is exposed to a cylindrical beam of X-rays parallel to the axis of said perforation, an enlarged X-ray shadograph of said specimen is formed at the base of said frusto-conical perforation.

2. As a new article of manufacture useful for the production of enlarged images by means of X-ray diffraction, in combination, a first solid having a frusto-conical perforation therethrough, a second solid having a frusto-conical perforation therethrough, and a sheet of a heavy metal, the axes of said perforations being in series, the apex orifices of each of said perforations abutting the apex orifice of the other, said sheet being at right angles to the main axes of said perforations, at least the inner surfaces of said perforations being composed of brass, the angles of the sides and the minimum diameters of the apical orifices thereof being characterized in that when a thin specimen of a heterogeneous material is placed at about the narrowest portion of the apex orifice of said first perforation transversely to the main axis thereof, and when the inner surface of said perforation is exposed to a cylindrical beam of X-rays parallel to the axis of said perforation, an enlarged X-ray shadograph of said specimen is formed at the base of said frusto-conical perforation.

3. As a new article of manufacture useful for the production of enlarged images by means of X-ray diffraction, in combination, a first solid having a frusto-conical perforation therethrough, a second solid having a frusto-conical perforation therethrough, and a sheet of lead, the axes of said perforations being in series, the apex orifices of each of said perforations abutting the apex orifice of the other, said sheet being at right angles to the main axes of said perforations, at least the inner surfaces of said perforations being composed of brass, the angles of the sides and the minimum diameters of the apical orifices thereof being characterized in that when a thin specimen of a heterogeneous material is placed at about the narrowest portion of the apex orifice of said first perforation transversely to the main axis thereof, and when the inner surface of said perforation is exposed to a cylindrical beam of X-rays parallel to the axis of said perforation, an enlarged X-ray shadograph of said specimen is formed at the base of said frusto-conical perforation.

DAN McLACHLAN, Jr.
EDMUND F. CHAMPAYGNE.

REFERENCES CITED

The following references are of record in the file of this patent:

UNITED STATES PATENTS

| Number | Name | Date |
| --- | --- | --- |
| 1,865,441 | Mutscheller | July 5, 1932 |
| 1,993,058 | Hahn | Mar. 5, 1935 |
| 2,500,948 | Kaiser et al. | Mar. 21, 1950 |

FOREIGN PATENTS

| Number | Country | Date |
| --- | --- | --- |
| 884,189 | France | 1943 |